A. L. STAGE.
MUSIC INSTRUCTION BOARD.
APPLICATION FILED OCT. 25, 1909.
1,000,448.
Patented Aug. 15, 1911.
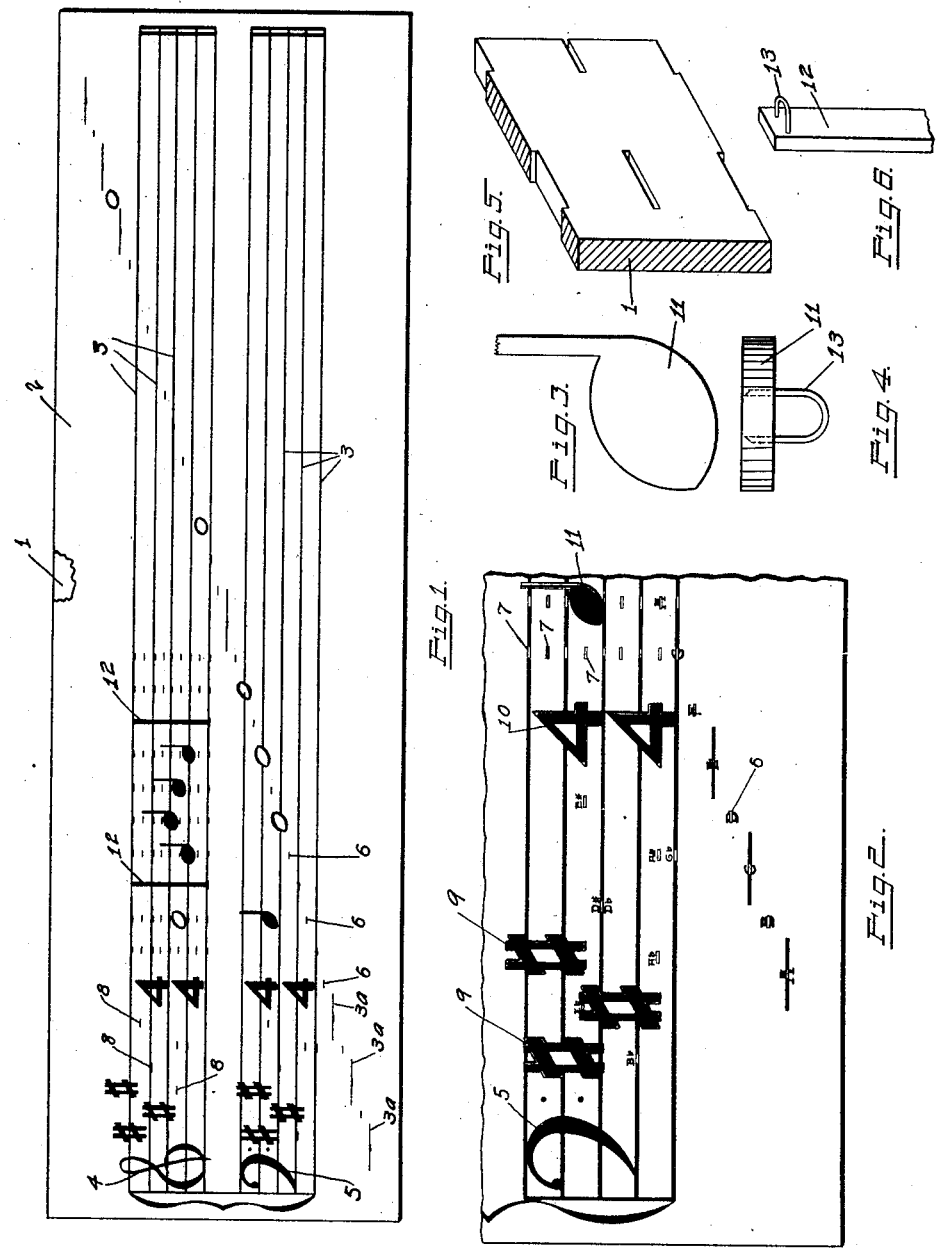
Inventor
ALBERT LIVINGSTON STAGE.
Witnesses
By
Attorney

UNITED STATES PATENT OFFICE.

ALBERT LIVINGSTON STAGE, OF COLUMBUS, OHIO.

MUSIC-INSTRUCTION BOARD.

1,000,448.  Specification of Letters Patent.  Patented Aug. 15, 1911.

Application filed October 25, 1909. Serial No. 524,360.

*To all whom it may concern:*

Be it known that I, ALBERT LIVINGSTON STAGE, a citizen of the United States, residing at Columbus, in the county of Franklin and State of Ohio, have invented certain new and useful Improvements in Music-Instruction Boards, of which the following is a specification.

My invention relates to the improvement of music instruction boards of that class in which means are provided for detachably connecting separately formed musical symbols with a printed staff.

The objects of my invention are to so construct and arrange a board and symbols of this class, as to provide a valuable assistance to the student of music in acquiring a knowledge of the positions and values of musical notes and other symbols with relation to or in connection with a music staff; to provide improved means for demonstrating the positions of the notes and symbols with reference to the lines of the staff; to provide improved means for detachably connecting music symbols with the board and to otherwise produce a simple and effective appliance by means of which a student may readily acquire a knowledge of the rudiments of musical composition. These objects I accomplish in the manner illustrated in the accompanying drawing, in which—

Figure 1 is a face view of my improved board on which is shown a printed double or grand staff, Fig. 2 is an enlarged view of a portion of the lower staff section, Fig. 3 is an enlarged view of the lower end portion of one of the detachable notes, Fig. 4 is an end elevation of the same, Fig. 5 is a view in perspective of a section of the board, and, Fig. 6 is a detail view in perspective of a portion of one of the detachable bars which I employ in the manner hereinafter described.

Similar numerals refer to similar parts throughout the several views.

In carrying out my invention, I employ a board of suitable outline and thickness and of desirable material such as is indicated at 1. The board thus provided has one face thereof covered with a sheet of paper or other suitable material 2, upon which is printed the lines 3 which form the usual music staff.

In the drawing, I have shown for the purpose of illustrating my invention a double or grand staff and adjacent to the left-hand end of the upper staff section is printed across the face of the staff in the usual manner a treble clef 4 and below the latter on the corresponding portion of the lower staff section, the usual bass clef 5. Formed in the board and extending in a diagonal line across the lower and upper staff sections, is a plurality of slotted openings 6, these openings being formed on and between the lines of the staff and on and between short line sections $3^a$ above and below the staff. Upon the paper facing of the board is printed over, about or adjacent to each of the slotted openings 6, a scale letter, these letters being arranged in their usual order. In Fig. 1 of the drawing, I have omitted the scale letters on account of the size of the drawing. As shown in the upper staff section of Fig. 1 and in Fig. 2, I provide that portion of the board on which the staff is carried, with vertical rows of slotted openings 7 corresponding with the openings 6 and immediately to the right of the clef symbols, I provide between and on the lines of the staff, similar slotted openings 8.

In constructing my device, I cause to be produced in outline from wood, metal or other material, the various musical signs or symbols, such as sharps and flats, the former being indicated at 9, the time indicating numerals 10, notes 11 and bars 12. In the construction of each of these outlined bodies, I provide the reverse side thereof with a staple-like projection 13 which extends at right angles with the face of the body of the note or other symbol, said staple-like projections or hangers being adapted to be inserted in the heretofore described slots of the board, thereby suspending the symbol body from and against the face of the board. It will be understood by reference to the drawing, that the sharps or flats and time indicating numerals formed as above described, are adapted to be thus supported in desirable positions in connection with the face of the board and that owing to the arrangement of the slotted openings 6 and 7, the whole, half, quarter or notes of other value, may be affixed to the board on or between the lines of the staff as desired or required by the insertion of the staple projections of said notes into the slotted openings of the board. In a like manner the staff may be divided into measures by inserting the projecting staples 13 of the upper end portions of the bars 12 into the proper slots on the upper line of the staff.

For the purpose of teaching the student the positions of the notes on, above or below the staff with relation to the scale letters thereof, I have as described, caused these scale letters to be printed on and between the staff lines in their proper positions, said scale letters being, however, of such size as to be covered by the bodies of the notes when the latter are attached to the board. Owing to the fact that all of the signs or symbols as described, are independently formed and readily attached to or detached from the board, it is obvious that the arrangement of the notes and other musical symbols may be changed at will by the student or the teacher and that by this operation and with the indicated scale lines as a guide, the student readily becomes familiar with the positions of the notes with relation to the lines of the staff and the teaching of the rudiments of music is acquired with comparative ease.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is—

1. In a music instruction board, the combination with a board having on one face thereof a printed musical staff, said board having a plurality of slots formed on and between the lines of the staff and having indicating characters marked on the board at selected slots to denote the pitch of the musical symbol or character to be placed thereon, of separately formed musical symbols or characters provided with means adapted to project through said slots to detachably connect the symbol or character to the board, the body of the character being of a size to conceal the note when placed in position on the board.

2. In a music instruction board, the combination with a board having on one face thereof a printed musical staff, said board having a plurality of slots formed on and between the lines of the staff with characters indicating the pitch of the musical symbol or note to be placed at a particular opening, of separately formed musical symbols or characters each provided with a staple-like member projecting from the rear of the symbol, which is adapted to be detachably engaged in one of the slots of the board and when so engaged being of a size to conceal the value of the indicating character adjacent said slots, said board also having a plurality of openings at the top line of the staff adapted to receive bars for marking the measure of the composition.

In testimony whereof I affix my signature in presence of two witnesses.

ALBERT LIVINGSTON STAGE.

Witnesses:
A. L. PHELPS,
E. V. GRISWOLD.

---

Copies of this patent may be obtained for five cents each, by addressing the "Commissioner of Patents, Washington, D. C."